(12) United States Patent
Han et al.

(10) Patent No.: US 8,165,597 B2
(45) Date of Patent: Apr. 24, 2012

(54) METHOD AND APPARATUS TO FACILITATE PARTITIONING USE OF WIRELESS COMMUNICATION RESOURCES AMONGST BASE STATIONS

(75) Inventors: Guang Han, Arlington Heights, IL (US); Rajeev Agrawal, Northbrook, IL (US); Anand S. Bedekar, Arlington Heights, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 304 days.

(21) Appl. No.: 12/692,834

(22) Filed: Jan. 25, 2010

(65) Prior Publication Data

US 2010/0248730 A1 Sep. 30, 2010

Related U.S. Application Data

(60) Provisional application No. 61/163,196, filed on Mar. 25, 2009.

(51) Int. Cl.
*H04W 72/00* (2009.01)

(52) U.S. Cl. ........ 455/453; 455/436; 455/560; 455/561; 370/329

(58) Field of Classification Search .......... 455/450–453, 455/436; 370/328, 329
See application file for complete search history.

(56) References Cited

U.S. PATENT DOCUMENTS

| | | | |
|---|---|---|---|
| 5,732,073 A | 3/1998 | Kusaki et al. | |
| 6,400,704 B2 | 6/2002 | Mikuni et al. | |
| 6,744,740 B2 * | 6/2004 | Chen | 370/255 |
| 6,771,968 B1 | 8/2004 | Huebel | |
| 7,352,690 B2 | 4/2008 | Geile et al. | |
| 7,352,779 B2 | 4/2008 | Geile et al. | |
| 7,355,963 B2 | 4/2008 | Geile et al. | |
| 7,355,964 B2 | 4/2008 | Geile et al. | |
| 7,391,712 B2 | 6/2008 | Geile et al. | |
| 7,391,753 B2 | 6/2008 | Tiedemann, Jr. et al. | |
| 7,392,015 B1 | 6/2008 | Farlow et al. | |
| 7,392,018 B1 | 6/2008 | Ebert et al. | |
| 7,558,577 B2 | 7/2009 | Dillon et al. | |
| 2003/0117966 A1 * | 6/2003 | Chen | 370/255 |

(Continued)

FOREIGN PATENT DOCUMENTS

JP 07-162948 A 6/1995

(Continued)

OTHER PUBLICATIONS

3GPP TSG-RAN Working Group 4 (Radio) meeting #46, R4-080409, Sorrento, Italy, Feb. 11-15, 2008, all pages.

(Continued)

*Primary Examiner* — Vladimir Magloire (57) ABSTRACT

A central controller (300) receives (201), from each of a plurality of base stations certain operating information. This operating information can comprise, for example, a self-identifier, information regarding allowed wireless distance coverage, identifiers for neighboring ones of the plurality of base stations, information regarding wireless distances to neighboring base station, or loading information. This operating information is used (202) to form adjacency information regarding the plurality of base stations. This adjacency information is then used (203) (along, for example, with the aforementioned loading information) to develop a resource allocation plan as pertains to the resources. This plan is then communicated (204) to the plurality of base stations such that the latter can utilize the plan to thereby partition use of the plurality of resources to support communication needs of the base stations while avoiding undue interference with respect to the use of such resources.

20 Claims, 3 Drawing Sheets

U.S. PATENT DOCUMENTS

| | | |
|---|---|---|
| 2004/0125768 A1 | 7/2004 | Yoon et al. |
| 2004/0192325 A1* | 9/2004 | Backes et al. ............... 455/453 |
| 2005/0130662 A1 | 6/2005 | Murai |
| 2006/0262750 A1 | 11/2006 | Walton et al. |
| 2007/0081449 A1 | 4/2007 | Khan |
| 2007/0087740 A1 | 4/2007 | Petersen et al. |
| 2007/0287464 A1 | 12/2007 | Hamamoto et al. |
| 2008/0081626 A1 | 4/2008 | Choi et al. |
| 2008/0311942 A1 | 12/2008 | Kim et al. |

FOREIGN PATENT DOCUMENTS

| | | |
|---|---|---|
| WO | WO 2005/015917 A2 | 2/2005 |
| WO | 2007-050018 A1 | 5/2007 |
| WO | WO 2007/126351 A1 | 11/2007 |
| WO | 2008-088253 A1 | 7/2008 |

OTHER PUBLICATIONS

Marcus Kahl, "Corresponding Application PCT/US2010/026173—PCT International Search Report and Written Opinion," WIPO, ISA/EP, European Patent Office, Rijswijk, Netherlands, Jun. 2, 2010, 14 pages, most relevant pp. 5-7 and 11-13.

3GPP TSG-RAN WG4 Meeting #44, "Spectrum Arrangement to enable Co-channel deployment of Home NodeBs", Nortel, Athens, Greece, Aug. 20-24, 2007, all pages.

3GPP TS 36.3000, v8.7.0 (Dec. 2008), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), all pages.

3GPP TR 25.820 v8.2.0 (Sep. 2008), 3rd Generation Partnership Project; Technical Specification Group Radio Access Networks; 3G Home NodeB Study Item Technical Report (Release 8), all pages.

3GPP TS 36.304, v8.4.0 (Dec. 2008), 3rd Generation Partnership Project; Technical Specification Group Radio Access Network; Evolved Universal Terrestrial Radio Access (E-UTRA); User Equipment (UE) procedures in idle mode (Release 8), all pages.

* cited by examiner

METHOD AND APPARATUS TO FACILITATE PARTITIONING USE OF WIRELESS COMMUNICATION RESOURCES AMONGST BASE STATIONS

RELATED APPLICATION(S)

This application is related to co-pending and co-owned U.S. patent application Ser. No. 12/261,483, entitled METHOD AND APPARATUS TO FACILITATE AVOIDING CONTROL SIGNALING CONFLICTS WHEN USING SHARED WIRELESS CARRIER RESOURCES and filed Oct. 30, 2008, which is incorporated by reference in its entirety herein.

This application is also related to co-pending and co-owned U.S. patent application No. 61/101,397, entitled METHOD AND APPARATUS TO FACILITATE PREVENTING INTERFERENCE AS BETWEEN BASE STATIONS SHARING CARRIER RESOURCES and filed Sep. 30, 2008, which is incorporated by reference in its entirety herein.

This application is also related to co-pending and co-owned U.S. patent application Ser. No. 61/163,210, entitled METHOD AND APPARATUS TO FACILITATE DIRECTLY ESTABLISHING A COMMUNICATION SESSION and filed on even date herewith and which is incorporated by reference in its entirety herein.

TECHNICAL FIELD

This invention relates generally to wireless communications system base stations and more particularly to the allocation of shared wireless communication resources amongst such base stations.

BACKGROUND

Base stations are known in the art. Base stations typically serve as a point of attachment and connection as between a communications network on the one hand and one or more end-user platforms on the other hand. In many cases, a given base station has a plurality of wireless communication resources that can be used to support such communications. In some cases, some or all of those wireless communication resources are shared with other base stations. When base stations that share such resources have overlapping service areas it can become more important to ensure that the use of such resources occurs without undue interference.

Some network architectures are potentially more susceptible to issues of this kind. For example, some architectures provide for so-called macrocell base stations that provide service to a relatively large coverage area (often measured in square miles) as well as so-called femtocell base stations that provide service to a relatively small coverage area (often measured in tens or hundreds of meters). Generally speaking, though such base stations may all share, at least to some extent, some plurality of wireless communication resources, the resources of the macrocell base station are open to a relatively large and open group of end users (such as all registered users of a cellular telephony service provider such as AT&T or Verizon) while the resources of the femtocell base station are open to only a relatively small and closed group of end users (such as only the members of a given family that reside at a given home).

In such cases, the operations of the femtocell base station and its users are restricted (for example, by law or regulation) from interfering with the operations of the macrocell base station and its users. Unfortunately, in many cases macrocell-base-station users generate large uplink interference for femtocell-base-station users. Similarly, in many cases macrocell-base-station users will experience large downlink interference from the femtocell base station itself.

BRIEF DESCRIPTION OF THE DRAWINGS

The above needs are at least partially met through provision of the method and apparatus to facilitate partitioning use of wireless communication resources amongst base stations described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a central controller can serve to receive, from each of a plurality of base stations that share a plurality of wireless communication resources that include at least one control channel and at least one data channel, certain operating information. This operating information can comprise, for example, a self-identifier, information regarding wireless distance coverage, identifiers for neighboring ones of the plurality of base stations, information regarding wireless distances to neighboring base station, information regarding one or more radio resources needed for supporting its users, or loading information. (Those skilled in the art will recognize that there can be two types of wireless distance coverage. One is the allowed wireless distance coverage as determined by the network, and another is the present wireless distance coverage that is controlled by each base station itself.)

This operating information is used to form adjacency information regarding the plurality of base stations. For example, assume the wireless distance between a first femtocell 1 and a second femtocell 2 is $L_{12}$ and that their allowed wireless distance coverages are respectively $R_1$ and $R_2$. One may then consider 1 and 2 to be neighbors if and only if $R_1+R_2-L_{12}>T$, where T is a threshold value determined by the operator based on various factors such as wall penetration loss. Moreover, one can introduce multiple thresholds whose values are larger than T. By comparing $R_1+R_2-L_{12}$ with these threshold values, the links between femtocells can be further categorized into strong links, medium links, and weak links. As another approach in these regards, present wireless distance coverage rather than allowed wireless distance coverage can be used to form the adjacency graph. This adjacency information can then be used (along, for example, with the aforementioned loading information) to develop a resource allocation plan as pertains to the wireless communication resources. This plan is then communicated to the plurality of base stations such that the latter can utilize the resource allocation plan to thereby partition use of the plurality of resources to support communication needs of the base stations while avoiding undue interference with respect to the use of such resources.

So configured, the partitioned use of such resources can readily take into account, for example, potential interference issues as between these base stations. Such a centralized approach can also take into account certain operational needs of a macrocell base station. In such a case the aforementioned resource allocation plan can provide for protecting certain of the wireless communication resources in favor of such a macrocell base station even while also facilitating the non-interfering use of such resources amongst a group of femtocell base stations.

Those skilled in the art will recognize and appreciate that such an approach can be readily employed in an economically favorable manner. These teachings are highly suitable for use in leveraging the operational feasibility of numerous existing architectural designs and are also highly scalable. In this regard, these teachings are readily employed in conjunction with essentially as many, or as few, base stations as desired. These teachings are also readily employed in conjunction with a variety of base stations and in any number of application settings.

Figure 1:
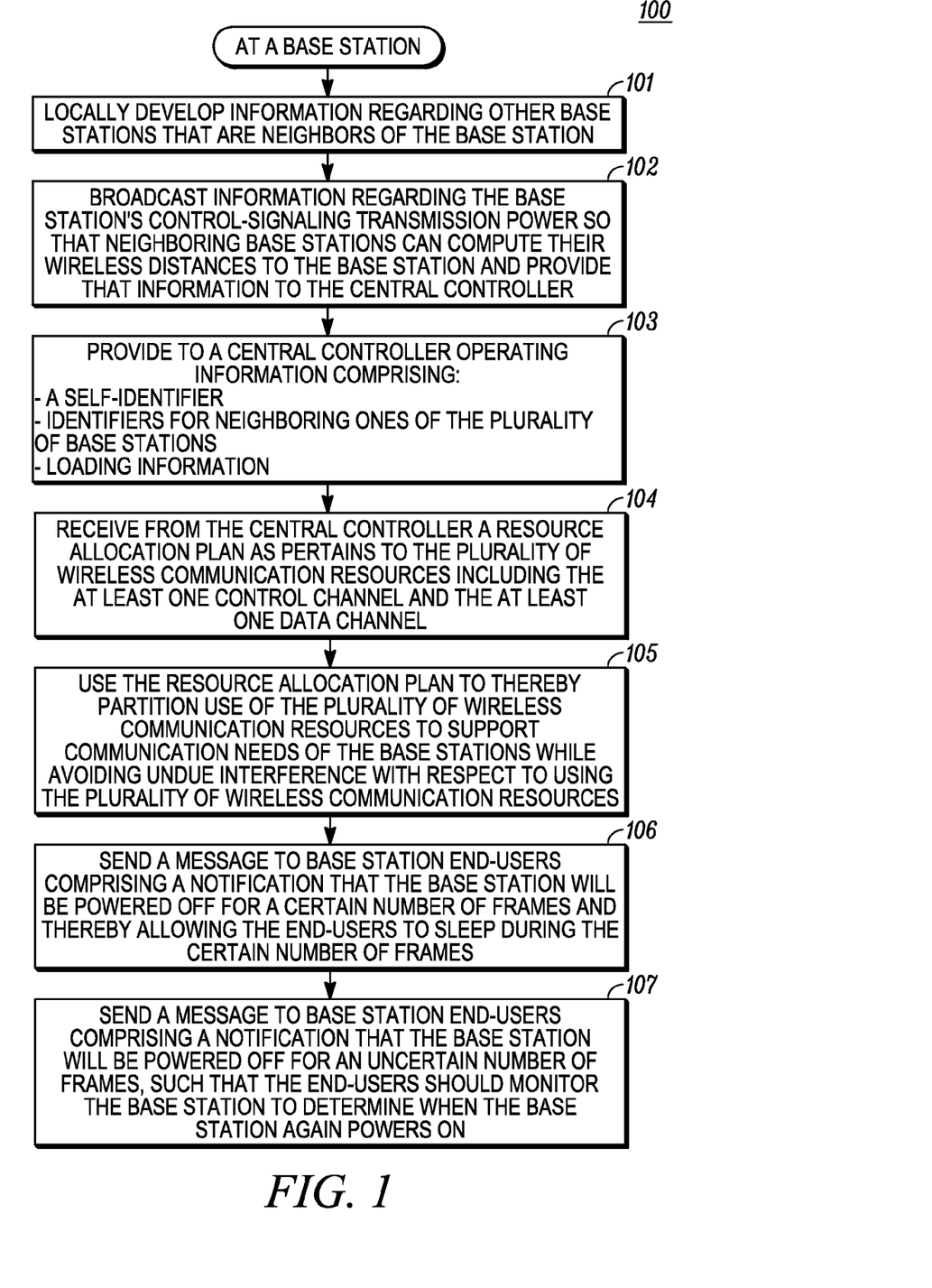
FIG. 1 comprises a flow diagram as configured in accordance with various embodiments of the invention.

These and other benefits may become clearer upon making a thorough review and study of the following detailed description. Referring now to the drawings, and in particular to FIG. 1, an illustrative process 100 that is compatible with many of these teachings will now be presented. This first described process 100 can be carried out at a base station (such as, but not limited to, a femtocell base station). This base station will be presumed to share use of a plurality of wireless communication resources with one or more other base stations. It shall further be understood that these resources include, but are not limited to, at least one control channel and at least one data channel. (As used herein, this reference to a "control channel" will be understood to refer to a channel that conveys (at least for the majority of its capacity) system overhead signaling (such as channel assignment information, power control information, and so forth) while "data channel" will be understood to refer to a channel that conveys (at least for the majority of its capacity) end-user payload content (such as voice or other audible information, textual content, graphic content (including animated graphic content), and so forth) being conveyed from, or to, an end user.) (Further below a corresponding process to be carried out by a central controller will then be described as well.)

This process 100 provides the step 101 of locally developing information regarding other base stations that are neighbors of this base station. (The expression "neighbors" will be understood to refer to base stations that wirelessly perceive the presence of this base station or who are themselves wirelessly perceived by this base station. In turn, this reference to "locally developing" will be understood to refer to the development of such information at the base station itself rather than at some remote location.) This locally developed information can vary to some extent with the application setting. By one approach, for example, this locally developed information can comprise identifying information as pertains to these neighboring base stations (such as, but not limited to, a corresponding Cell Global Identifier (CGI), information regarding wireless distances to each such base station (expressed, for example, in dB's), and so forth.

There are various ways to carry out this step 101. For example, by one approach, this step 101 can comprise, at least in part, the base station transmitting a code sequence or a message to announce its existence (using, by one approach and if desired, a particular spreading code that is reserved for use by base stations when transmitting such a message). Its neighboring base station will detect the message and send corresponding reports to the centralized controller. Such reports can include, for example, the aforementioned neighboring base station identifiers, information regarding the quality of the signal being received by the neighboring base stations as pertains to the transmitted announcement message (such as received signal strength information, bit error code information, and so forth), the wireless distance to the neighboring base station, and other information as may be desired or available in a particular application setting. To ensure detection of such a transmission, every base station can periodically operate using a listening mode to monitor downlink transmissions from neighboring base stations during certain predetermined (i.e., scheduled) time intervals. If a base station notices any changes with respect to its neighboring base station(s) (such as the corresponding wireless distance), that base station can update the centralized controller accordingly. Moreover, if the base station modifies its own settings (such as the present wireless distance coverage), the base station can also notify the centralized controller of these changes. Also, instead of directly detecting the neighbors, such a base station may also ask their users to perform the detection for them. After receiving reports from all base stations regarding the given base station, the centralized controller can apprise the given base station of its neighbor information.

By one approach, these base stations can transmit broadcast information to one another regarding their own control-signaling transmission power. This can comprise, for example, transmitting a control-signaling message at a particular transmission power, which message includes a representation of that transmission power. This information can then be used by the receiving base station to compute their wireless distances from one another such that such information can then be provided to a central controller as described below. In such a case, the aforementioned step 101 of locally developing information regarding other base stations can include receiving such a transmission and making the corresponding calculations to determine the corresponding wireless distance(s). Also in such a case, this process 100 will optionally accommodate the step 102 of having this base station broadcast such information to permit the neighboring base stations to effect a similar action.

In the example just provided, a wireless distance calculation is predicated upon the strength of a received broadcast message, which message includes information regarding the transmission power used to transmit the message. Those skilled in the art will understand that other possibilities can also serve in these regards. As but one example in these regards, such a transmission can always be made at a given fixed transmission power. In this case, the receiving base station will know the transmission power by the type of message and can again make the corresponding calculation of the wireless distance.

In any event, this process 100 then provides the step 103 of providing to a central controller operating information comprising, at least in part, a self-identifier for the base station (such as, but not limited to, a CGI), identifiers for neighboring ones of the plurality of base stations, and loading information. Such information can be provided via any communication path of convenience including a wireless pathway or a non-wireless pathway that may include a network such as the Internet. The referred-to loading information can comprise, by one example, current loading statistics that reflect the present service loading experience for the base station. By another example, this loading information can comprise estimated future loading requirements (based, for example, on historical loading experience on given days at given times).

By one approach, this step 103 can also comprise providing one or more weighting factors to the central controller. These weighting factors can reflect the fact that some presently-supported or anticipated traffic may have differing real-time resource allocation requirements. For example, a higher weighting factor can be provided to indicate a need for supporting time-sensitive end-user content (such as real-time voice communications, streaming audio or video content, and so forth). As another example, a lower weighting factor can be provided to indicate a need for supporting less time-sensitive end-user content such as a file transfer or the like. When a base station needs to support different end-user contents with varying delay requirements, it can estimate the required radio resource for every end-user content, and provide this information as well as corresponding weighting factors to the central controller.

In any event, this process 100 also provides the step 104 of receiving from the central controller a resource allocation plan as pertains to the plurality of wireless communication resources (including the at least one control channel and the at least one data channel). By one approach, this can comprise receiving the entire plan as promulgated by the central controller. By another approach, this can comprise receiving an abridged version of the plan. This abridged version can comprise, for example, only that part of the allocation plan that is directly relevant to the receiving base station.

If the central controller can not find a feasible resource allocation plan according to the operating information provided by the base stations, by one approach it may ignore some operation requests made by one or more of the base stations for supporting less sensitive end-user content or it may allow concurrent operation between two femtocells that are "weakly" linked with each other. As another approach in these regards, the central controller may ask one or more of the base stations to change their allowed wireless distance coverage or even present wireless distance coverage to reduce cell transmission power, thus minimizing interference among neighboring base stations.

By one approach, this received allocation plan can be understood to apply unless and until a subsequent substitute allocation plan or other instruction is received in these regards. By another approach, the central controller can also provide an expiration time by when observation of and adherence to the allocation plan shall conclude in the absence of any other instructions to the contrary.

The resource allocation plan itself can convey, directly or indirectly as the requirements or opportunities as tend to characterize a given application setting shall dictate or permit, the specific wireless communication resources that the receiving base station is to use, that the receiving base station is to avoid using, or both.

This process 100 then provides the step 105 of using this resource allocation plan to thereby partition use of the plurality of wireless communication resources when supporting the communication needs of this base station while also avoiding undue interference with respect to using this plurality of wireless communication resources. (As used herein, this reference to "undue interference" will be understood to refer to an amount, kind, or degree of interference that is sufficient to cause a noticeable disruption in the ability of an end user to perceive the received interfered-with content.)

As noted earlier, these teachings are particularly intended to aid in reducing wireless communications-based interference as between various base stations. To that end, this process 100 can optionally accommodate other steps as well. For example, using one optional step 106, this base station can send a message to its end users that comprises a notification that the base station will be powered off (for example, for a certain number of frames) to thereby allow those corresponding end-user platforms to sleep during the indicated time (for example, during a certain number of identified frames). This provides a useful mechanism for allowing the base station to reduce its own transmission activity (and hence to reduce its ability to interfere with the wireless activities of end users of other base stations) without causing undue operational consternation amongst its own end-user population.

As another example in these regards, this process 100 will also optionally accommodate the step 107 of sending a message to the end users of this base station comprising a notification that the base station will be powered off for an uncertain number of frames (such that the end users shall know to monitor the base station in order to determine when the base station again powers on). Again, this can provide a potentially useful mechanism to permit the base station to potentially dramatically reduce its own transmissions under certain circumstances without effectively losing its end users. Other than explicitly broadcasting a message to alert its users, the base station can perform the same task in a more transparent manner by appropriately setting the Downlink Transmission/Downlink Reception (DTX/DRX) cycles of its users.

Those skilled in the art will recognize that other possibilities exist in these regards and that these specific examples have been provided as being illustrative in these regards and without any intent to suggest specific limitations in these regards.

The above-described process 100 is suitable for use with base stations and particularly with femtocell base stations. As already noted, this process 100 provides for providing information to, and receiving information from, a central controller. A corresponding process 200 that can be carried out by such a central controller will now be described.

Figure 2:
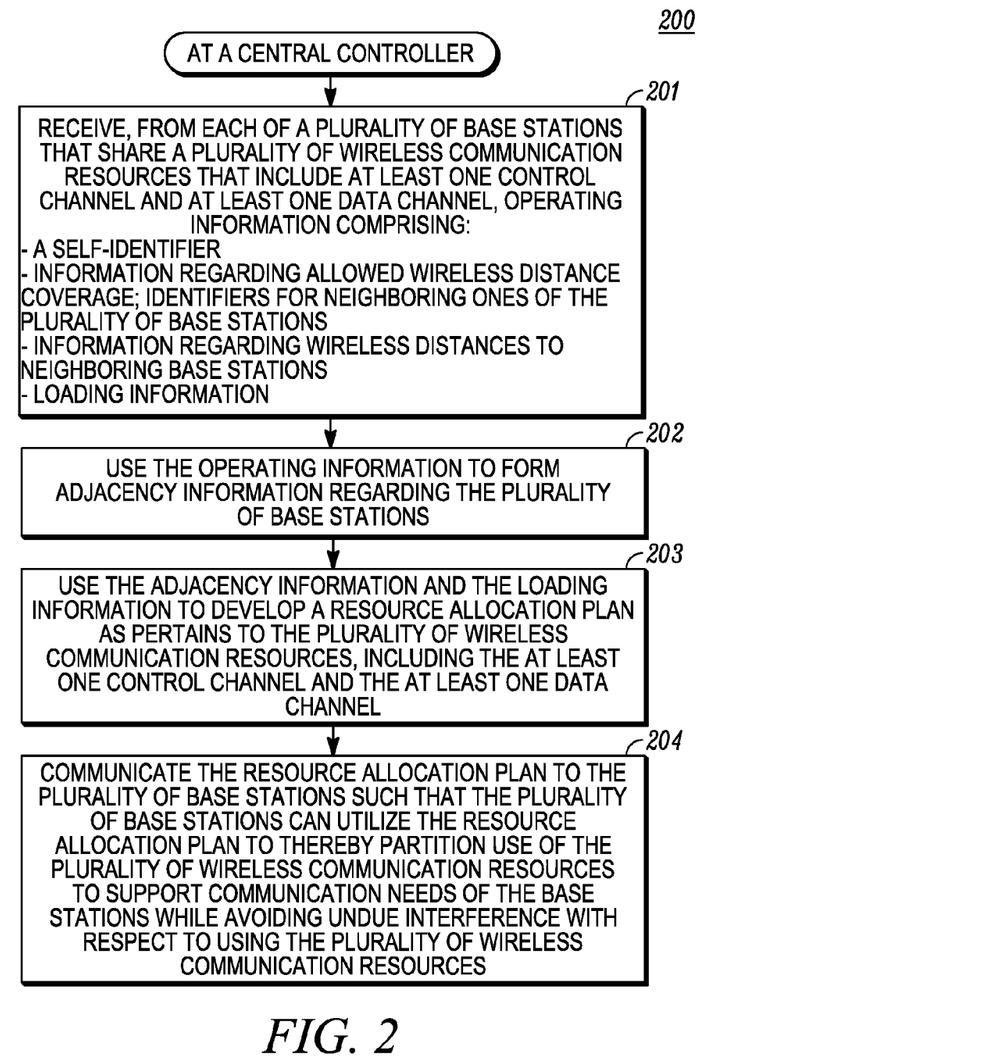
FIG. 2 comprises a block diagram as configured in accordance with various embodiments of the invention.

Referring to FIG. 2, this process 200 provides the step 201 of receiving, from each of a plurality of base stations such as those described above, operating information comprising a self-identifier (such as a CGI) for the particular base station that sources a given received transmission, information regarding allowed wireless distance coverage (expressed, for example, in decibels as is known in the art), identifiers (such as CGI's) for neighboring ones of the plurality of base stations, information regarding wireless distances to neighboring base stations (again expressed, for example, in decibels), loading information (such as projected traffic loading, information regarding channel conditions, and the like), and so forth. As noted above, if desired, this operating information can also comprise weighting information corresponding to time sensitivity for traffic.

If desired, this process 200 will also accommodate receiving information regarding actual detected interference as pertains to the plurality of wireless communication resources. This can comprise interference detected directly by a given base station, for example, or can comprise interference as detected and reported by a given end-user platform. Such information can, for example, identify the interfered-with channel, the corresponding base station, a corresponding time stamp, a quantification of the interference, and so forth as desired.

This process 200 also provides the step 202 of using this received operating information to form adjacency information regarding the plurality of base stations. By one approach, if desired, this adjacency information can be tabulated in a form akin to an actual or virtual graph or chart that depicts each base station of interest and the wireless distance between adjacent base stations. By one approach, the central controller can be already apprised of the existence and even the relative positions of some or all of these base stations. Such a priori information can then be supplemented with the wireless distance information provided by the base stations themselves. By another approach, this step 202 can include the derivation of such information based upon the operating information being provided by the various base stations. The particular approach selected for use in a given application setting may depend, at least to some extent, upon the available information resources as tend to characterize that setting.

This process 200 then provides the step 203 of using this adjacency information and the aforementioned loading information to develop a resource allocation plan as pertains to the plurality of wireless communication resources (including the one or more control channels and the one or more data channels). This step 203 can also comprise using the aforementioned detected-interference information or the weighting information when such is available. Generally speaking, this step 203 comprises parsing the wireless communication resources in a manner that tends to ensure that the communication needs of each base station are met while also tending to ensure that interference with other base stations is mitigated if not fully avoided.

The precise way in which this is accomplished will of course vary with the particular circumstances of a given application setting. When the wireless communication resources comprise a plurality of different carrier frequencies, this can comprise, at least in part, assigning different frequencies to different base stations (insofar as this is possible). When the wireless communication resources comprise a plurality of different time slots, this can comprise, at least in part, assigning different time slots to different base stations (insofar as this is possible). Such allocation methodologies are themselves generally well understood in the art and require no further elaboration here.

This process 200 then provides the step 204 of communicating this resource allocation plan to the plurality of base stations such that the plurality of base stations can utilize the resource allocation plan to thereby partition use of the wireless communication resources to support their communication needs while avoiding undue interference with respect to the use of these wireless communication resources as described above. By one approach, this can comprise providing the entire allocation plan to each of the base stations. By another approach, this can comprise providing to each base station only those portions of the plan that are specifically relevant to the operations of each base station.

Figure 3:
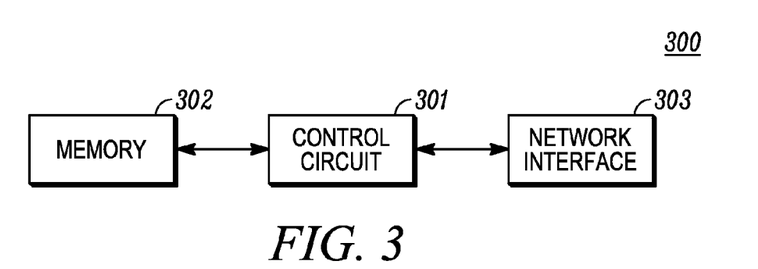
FIG. 3 comprises a flow diagram as configured in accordance with various embodiments of the invention.

Those skilled in the art will appreciate that the above-described process 200 is readily enabled using any of a wide variety of available and/or readily configured platforms, including partially or wholly programmable platforms as are known in the art or dedicated purpose platforms as may be desired for some applications. Referring now to FIG. 3, an illustrative approach to such a platform will now be provided.

In this illustrative example, the central controller 300 comprises a control circuit 301 that operably couples to a memory 302 and a network interface 303. The memory 302 can serve to store the aforementioned received base-station information, the formulated adjacency information, the resource allocation plan, and such other information as may be useful to these purposes in a given application setting. It will also be understood that the memory component shown can comprise a plurality of memory elements or can be comprised of a single memory element (as is suggested by the illustration). Such architectural options are well understood in the art and need no further description here.

The network interface 303 can vary with the specifics of a given application setting but in general serves as a mechanism by which the central controller 300 can receive the aforementioned information from the base stations and by which the central controller 300 can provide the resource allocation plan to the base stations. By way of illustration and not by way of limitation, this network interface 303 can comprise an Internet interface as is known in the art.

The control circuit 301 can comprise a fixed-purpose hard-wired platform or can comprise a partially or wholly-programmable platform (such as a microprocessor or the like). All of these architectural options are well known and understood in the art and require no further description here. This control circuit 301 can be configured to carry out one or more of the steps, actions, or functions that are described herein. By one approach, this configuration can comprise programming the control circuit 301 in these regards. Such programming is well within the means of those skilled in the art and requires no further elaboration here. When this programming comprises, in whole or in part, a corresponding computer program, this program can also be stored, if desired, in the aforementioned memory 302.

Those skilled in the art will recognize and understand that such an apparatus 300 may be comprised of a plurality of physically distinct elements as is suggested by the illustration shown in FIG. 3. It is also possible, however, to view this illustration as comprising a logical view, in which case one or more of these elements can be enabled and realized via a shared platform. It will also be understood that such a shared platform may comprise a wholly or at least partially programmable platform as are known in the art.

Those skilled in the art will recognize and appreciate that these teachings are readily employed in a variety of application settings. For the sake of illustration some specific examples in these regards will now be provided. Those skilled in the art will recognize and understand that these examples are intended to serve only in an illustrative capacity and are not intended to comprise an exhaustive listing of all possibilities in this regard.

Figure 4:
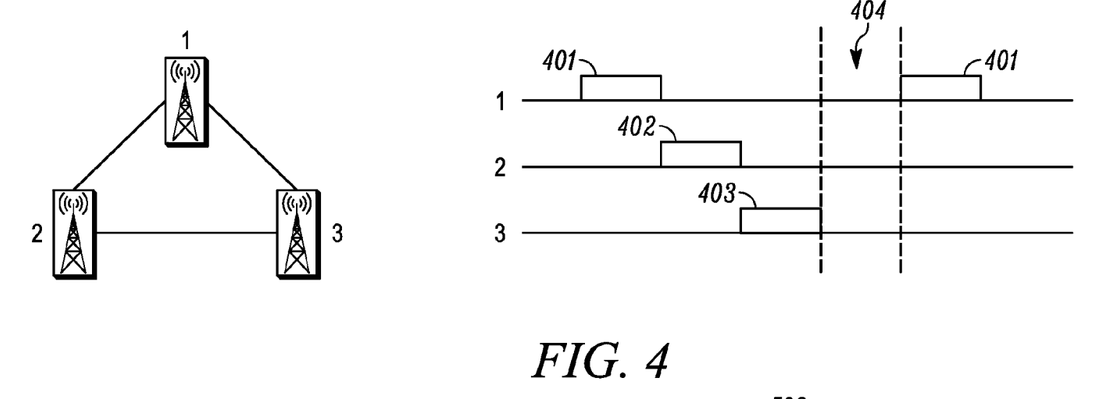
FIG. 4 comprises a combined block diagram and timing diagram as configured in accordance with various embodiments of the invention.

Referring now to FIG. 4, in this first example there are three base stations 1, 2, and 3 that are configured to act in accordance with these teachings. For the sake of simplicity, it will be presumed that these three base stations all share a same carrier frequency. It will also be presumed that these three base stations are femtocell base stations that share this same carrier frequency with a macrocell base station (not shown).

In this example, the three base stations 1, 2, and 3 are all essentially equidistant from one another, such that base station 1 has as adjacent neighbors base stations 2 and 3, and so forth.

Pursuant to these teachings, these three base stations develop their information regarding their neighbors and their corresponding relative distances. This information is then provided to a central controller (not shown) as described herein. This central controller then develops corresponding adjacent base station information and uses that information to derive a resource allocation plan for use by these three base stations. Pursuant to this particular plan, base station 1 is allocated a first time slot 401, base station 2 is allocated a second time slot 402, and base station 3 is allocated a third time slot 403 wherein these time slots do not overlap in time and further wherein a fourth time slot area (denoted by reference numeral 404) remains unallocated to any of these three base stations.

So allocated, the transmissions of these three base stations will not interfere with one another as they do not impinge upon one another's transmission/reception windows. It can also be seen that the unallocated portion 404, when used by the aforementioned macrocell base station, will assure that the transmission activity as corresponds to the three base stations will not interfere with the activities of the macrocell base station.

Figure 5:
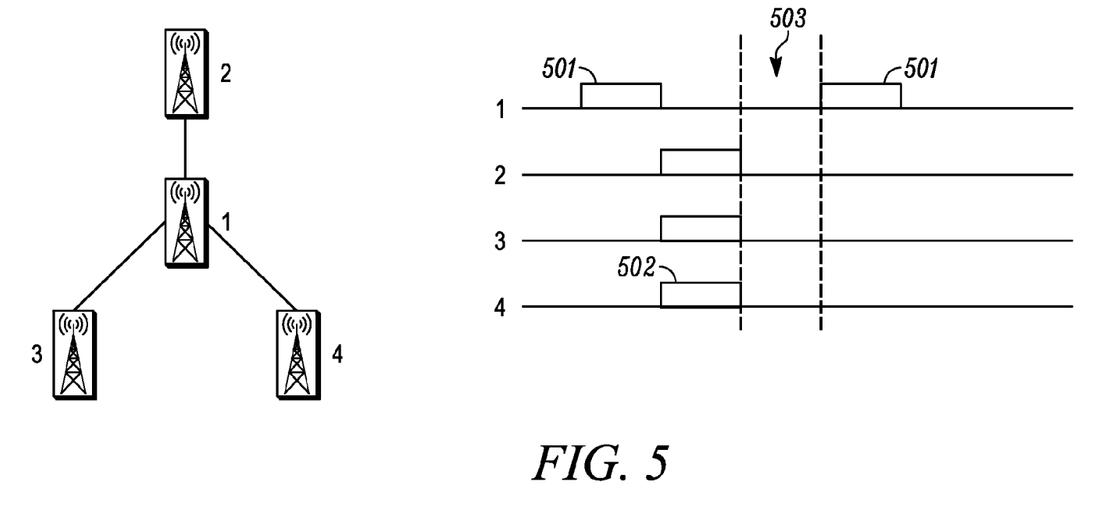
FIG. 5 comprises a combined block diagram and timing diagram as configured in accordance with various embodiments of the invention.

Referring now to FIG. 5, in another example each of base stations 2, 3, and 4 is sufficiently far from one another to substantially eliminate a concern that the transmissions of these various base stations will interfere with the operations of the others. Accordingly, the central controller's corresponding resource allocation plan can permit the same time slot 502 to be assigned to all three of these base stations. Base station 1, however, is centrally located between all three of these base stations and is sufficiently close to each to permit corresponding interference. The central controller's allocation plan therefore, in this example, allocates to base station 1 a time slot 501 that is temporally distinct from the time slot 502 assigned to base stations 2, 3, and 4. As before, the central controller also protects another time slot 503 that is held for use by the aforementioned macrocell base station.

In summary, to avoid coverage hole created by neighbouring HNBs, a centralized power control mechanism is proposed as follows: a) When powered up, a HNB will listen to neighbouring cell transmissions, determine the Global Cell ID (GCI) of these neighbouring cells, and report them to the centralized controller. A HNB may also ask its UEs to make measurements of any detected interfering cells, and their GCIs will be reported to the centralized controller as well, b) As each HNB reports its neighbours, the centralized controller can form an adjacency graph of all HNBs, c) Each HNB estimates the fraction of time it needs to operate according to the traffic load and radio conditions of its UEs, and reports this value to the centralized controller, d) Given the adjacency graph and the reported fraction of time needed by each HNB, the centralized controller determines the time slots that each HNB is allowed to operate, and e) A HNB has to significantly reduce its transmission (including control channels) power during the time slots that it is not allowed to transmit. To enable this, it needs to enter compressed mode if some of its users use dedicated channel; or it needs to appropriately set the DRX/DTX cycles of its users if they all use shared channel Again, it will be understood that these are but two simple examples with numerous other possibilities being possible. These teachings are readily applied in a wide variety of application settings and in conjunction with a wide variety of differing wireless communication resources. It will further be understood that these teachings are highly scalable and can be employed with a relatively few or a relatively large number of base stations, wireless communication resources, and so forth.

Those skilled in the art will also recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
    at a central controller:
        receiving, from each of a plurality of base stations that share a plurality of wireless communication resources that include at least one control channel and at least one data channel, operating information comprising:
        a self-identifier;
        information regarding allowed wireless distance coverage;
        identifiers for neighboring ones of the plurality of base stations;
        information regarding wireless distances to neighboring base stations;
        loading information;
        using the operating information to form adjacency information regarding the plurality of base stations;
        using the adjacency information and the loading information to develop a resource allocation plan as pertains to the plurality of wireless communication resources, including the at least one control channel and the at least one data channel;
        communicating the resource allocation plan to the plurality of base stations such that the plurality of base stations can utilize the resource allocation plan to thereby partition use of the plurality of wireless communication resources to support communication needs of the base stations while avoiding undue interference with respect to using the plurality of wireless communication resources.

2. The method of claim 1 wherein the self-identifier and the identifiers each comprise a Cell Global Identifier.

3. The method of claim 1 wherein the loading information comprises information regarding projected traffic loading.

4. The method of claim 1 wherein the loading information comprises information regarding channel conditions.

5. The method of claim 1 wherein using the adjacency information and the loading information to develop a resource allocation plan as pertains to the plurality of wireless communication resources comprises developing a resource allocation plan that, at least in part, avoids time-based instances of interference.

6. The method of claim 1 wherein: receiving the operating information comprises receiving operating information that further comprises information regarding detected interference as pertains to the plurality of wireless communication resources; using the adjacency information and the loading information to develop a resource allocation plan as pertains to the plurality of wireless communication resources further comprises using the adjacency information, the loading information, and the information regarding detected interference to develop a resource allocation plan as pertains to the plurality of wireless communication resources.

7. The method of claim 1 wherein receiving the operating information further comprises receiving weighting information corresponding to time sensitivity for traffic.

8. A central controller comprising:
a memory;
a network interface;
a control circuit operably coupled to the memory and the network interface and being configured to:
receive via the network interface, from each of a plurality of base stations that share a plurality of wireless communication resources that include at least one control channel and at least one data channel, operating information comprising:
a self-identifier;
information regarding allowed wireless distance coverage;
identifiers for neighboring ones of the plurality of base stations;
loading information;
information regarding wireless distances to neighboring base stations; loading information;
and store the operating information in the memory; use the operating information to form adjacency information regarding the plurality of base stations;
use the adjacency information and the loading information to develop a resource allocation plan as pertains to the plurality of wireless communication resources including the at least one control channel and the at least one data channel;
communicate the resource allocation plan via the network interface to the plurality of base stations such that the plurality of base stations can utilize the resource allocation plan to thereby partition use of the plurality of wireless communication resources to support communication needs of the base stations while avoiding undue interference with respect to using the plurality of wireless communication resources.

9. The central controller of claim 8 wherein the self-identifier and the identifiers each comprise a Cell Global Identifier.

10. The central controller of claim 8 wherein the loading information comprises information regarding projected traffic loading.

11. The central controller of claim 8 wherein the loading information comprises information regarding channel conditions.

12. The central controller of claim 8 wherein the control circuit is further configured to use the adjacency information and the loading information to develop a resource allocation plan as pertains to the plurality of wireless communication resources by developing a resource allocation plan that, at least in part, avoids time-based instances of interference.

13. The central controller of claim 8 wherein the control circuit is further configured to: receive information regarding detected interference as pertains to the plurality of wireless communication resources and store the information regarding detected information in the memory; use the adjacency information, the loading information, and the information regarding detected interference to develop a resource allocation plan as pertains to the plurality of wireless communication resources.

14. A method comprising:
at a base station that shares use of a plurality of wireless communication resources, including at least one control channel and at least one data channel, with other base stations:
locally developing information regarding which of the other base stations are neighbors of the base station;
providing to a central controller operating information comprising:
a self-identifier;
information regarding allowed wireless distance coverage;
identifiers for neighboring ones of the plurality of base stations;
loading information;
information regarding wireless distances to neighboring base stations; loading information;
receiving from the central controller a resource allocation plan as pertains to the plurality of wireless communication resources including the at least one control channel and the at least one data channel;
using the resource allocation plan to thereby partition use of the plurality of wireless communication resources to support communication needs of the base stations while avoiding undue interference with respect to using the plurality of wireless communication resources.

15. The method of claim 14 wherein locally developing information regarding which of the other base stations are neighbors of the base station comprises:
transmitting a message to announce the base station; receiving responses from the other base stations that receive the message, which responses include corresponding identifiers.

16. The method of claim 15 wherein transmitting a message to announce the base station comprises transmitting the message using a particular spreading code that is reserved for use by base stations when transmitting such a message.

17. The method of claim 14 wherein providing the operating information to the central controller further comprises providing weighting information corresponding to time sensitivity for traffic.

18. The method of claim 14 further comprising: broadcasting information regarding the base station's control-signaling transmission power so that neighboring base stations can compute their wireless distances to the base station and provide that information to the central controller.

19. The method of claim 14 further comprising: sending a message to base station end-users comprising a notification that the base station will be powered off for a certain number of frames and thereby allowing the end-users to sleep during the certain number of frames.

20. The method of claim 14 further comprising: sending a message to base station end-users comprising a notification that the base station will be powered off for an uncertain number of frames, such that the end-users should monitor the base station to determine when the base station again powers on.

* * * * *